(12) United States Patent
Trent

(10) Patent No.: US 8,898,621 B2
(45) Date of Patent: *Nov. 25, 2014

(54) METHODS AND SYSTEMS FOR IMPLEMENTING A LOGICAL PROGRAMMING MODEL

(75) Inventor: Jeffrey Trent, Medford, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/845,002

(22) Filed: Jul. 28, 2010

(65) Prior Publication Data

US 2011/0088044 A1    Apr. 14, 2011

Related U.S. Application Data

(60) Provisional application No. 61/250,064, filed on Oct. 9, 2009.

(51) Int. Cl.
*G06F 9/44* (2006.01)
*G06F 9/50* (2006.01)

(52) U.S. Cl.
CPC ........... *G06F 9/5072* (2013.01); *G06F 8/20* (2013.01)
USPC ........................................... 717/104

(58) Field of Classification Search
CPC ........... G06F 8/20; G06F 8/35; G06F 9/5072
USPC ................................. 717/104, 105
See application file for complete search history.

(56) References Cited

U.S. PATENT DOCUMENTS

| | | | |
|---|---|---|---|
| 6,178,529 B1 | 1/2001 | Short et al. | |
| 7,519,711 B2 * | 4/2009 | Mohindra et al. | 709/226 |
| 7,735,085 B2 | 6/2010 | Geib et al. | |
| 7,945,671 B2 * | 5/2011 | Mohindra et al. | 709/226 |
| 2005/0005250 A1 * | 1/2005 | Jones | 716/1 |
| 2005/0138618 A1 | 6/2005 | Gebhart | |
| 2006/0101444 A1 * | 5/2006 | Pepin et al. | 717/165 |
| 2006/0294238 A1 * | 12/2006 | Naik et al. | 709/226 |
| 2007/0174815 A1 * | 7/2007 | Chrysanthakopoulos et al. | 717/120 |
| 2007/0240109 A1 * | 10/2007 | Chandra et al. | 717/114 |
| 2007/0294364 A1 * | 12/2007 | Mohindra et al. | 709/217 |

(Continued)

OTHER PUBLICATIONS

Foster et al., "Grid Services for Distributed System Integration," Jun. 2002, IEEE, p. 37-46.*

(Continued)

*Primary Examiner* — Qing Chen
(74) *Attorney, Agent, or Firm* — Kilpatrick Townsend & Stockton LLP

(57) ABSTRACT

Embodiments of the invention provide systems and methods for implementing a logical programming model that separates a resource from its state and processes the resource and the state of the resource independently. According to one embodiment, a method of method for implementing a logical programming model can comprise defining a resource and defining one or more state objects for the resource. An application can be defined including at least one instance of the defined resource and at least one instance of the defined one or more state objects. Logic of the application can handle the one or more state objects independent from the resource.

19 Claims, 5 Drawing Sheets

(56) References Cited

U.S. PATENT DOCUMENTS

| | | |
|---|---|---|
| 2007/0294405 A1* | 12/2007 | Mohindra et al. ............ 709/226 |
| 2008/0092140 A1 | 4/2008 | Doninger et al. |
| 2008/0126110 A1* | 5/2008 | Haeberle et al. ................. 705/1 |
| 2008/0168424 A1* | 7/2008 | Mohindra et al. ............ 717/120 |
| 2008/0275935 A1* | 11/2008 | Mohindra et al. ............ 709/201 |
| 2010/0287543 A1* | 11/2010 | Wehkamp ..................... 717/171 |
| 2011/0087848 A1 | 4/2011 | Trent |

OTHER PUBLICATIONS

Misek, Rob, "Defining a Data Grid—Coherence 3.5 User Guide—Oracle Coherence Knowledge Base," <http://coherence.oracle.com/display/COH35UG/Defining+a+Data+Grid>, Oct. 5, 2009, Oracle, p. 1-3.*

U.S. Appl. No. 12/845,009, filed Jul. 28, 2010, Office Action mailed Sep. 7, 2012, 9 pages.

\* cited by examiner

METHODS AND SYSTEMS FOR IMPLEMENTING A LOGICAL PROGRAMMING MODEL

REFERENCE TO RELATED APPLICATIONS

This application is related to and claims the benefit of U.S. Provisional Patent Application No. 61/250,064 filed Oct. 9, 2009 by Trent and entitled "Switchboard" of which the entire disclosure is incorporated herein by reference for all purposes.

The present application is also related to U.S. Pat. No. 8,438,251, issued May 7, 2013, entitled "Methods and Systems for Implementing a Virtual Storage Area Network" which is filed concurrently herewith and also incorporated herein by reference for all purposes.

BACKGROUND

Embodiments of the present invention relate generally to methods and systems for implementing a logical programming model and more particularly to implementing a logical programming model that separates a resource from its state and processes the resource and the state of the resource independently.

Previously, developers interested in developing scalable service oriented applications had to use platforms such as J2EE® (including EJB, JMS, WS, etc.). These platforms were fairly static in nature, where applications and modules were built and deployed to a "server" node. Remote clients would then communicate to the server node to access it's services. Changes to these topologies were somewhat cumbersome and the application/module could only be targeted to a "server" node. Developers had access to "Session" state provided by the underlying framework such as HttpSession from J2EE®'s web container. All other forms of state were left to the developer to solve in various proprietary, disjointed ways. There was no holistic way for the framework to handle multiple forms of state seamlessly in the same application, managed under the framework (i.e., Conversational State, Global State, etc.) Hence, there is a need for improved methods and systems for implementing a logical programming model.

SUMMARY

Embodiments of the invention provide systems and methods for implementing a logical programming model that separates a resource from its state and processes the resource and the state of the resource independently. According to one embodiment, a method of method for implementing a logical programming model can comprise defining a resource and defining one or more state objects for the resource. An application can be defined including at least one instance of the defined resource and at least one instance of the defined one or more state objects. Logic of the application can handle the one or more state objects independent from the resource.

For example, the one or more state objects can include a global state object available to a plurality of resources. Additionally or alternatively, the one or more state objects may include a conversational state object representing an information flow for the resource. The one or more state objects can include a request state object representing platform specific information for the resource. In some cases, one or more state objects can additionally or alternatively include a session state object representing information specific to a session of the resource. The resource and the one or more state objects can be location agnostic and environment agnostic.

In some cases, the resource or multiple resources can comprise one or more processes. For example the process can comprise a service or a plurality of services. In such a case, one or more state objects can be defined for each of the plurality of services. Furthermore, in some cases, a federation of services within the plurality of services can be defined wherein the services of the federation share at least one state object. Whether federated or not, the plurality of services can be executed on a computing grid such as, for example, an Oracle® Coherence grid. In such a case, access to the plurality of services and the one or more state objects can be provided via membership and routing protocols of the grid.

According to another embodiment, a system can comprise a processor and a memory communicatively coupled with and readable by the processor. The memory can have stored therein a series of instructions which, when executed by the processor, cause the processor to execute a development environment for implementing a logical programming model. The development environment can be adapted to define a resource, define one or more state objects for the resource, and define an application including at least one instance of the defined resource and at least one instance of the defined one or more state objects. The logic of the application can handle the one or more state objects independent from the resource.

For example, the one or more state objects can include a global state object available to a plurality of resources. Additionally or alternatively, the one or more state objects may include a conversational state object representing an information flow for the resource. The one or more state objects can include a request state object representing platform specific information for the resource. In some cases, one or more state objects can additionally or alternatively include a session state object representing information specific to a session of the resource. The resource and the one or more state objects can be location agnostic and environment agnostic.

In some cases, the resource or multiple resources can comprise one or more processes. For example the process can comprise a service or a plurality of services. In such a case, one or more state objects can be defined for each of the plurality of services. Furthermore, in some cases, a federation of services within the plurality of services can be defined wherein the services of the federation share at least one state object. Whether federated or not, the plurality of services can be executed on a computing grid such as, for example, an Oracle® Coherence grid. In such a case, access to the plurality of services and the one or more state objects can be provided via membership and routing protocols of the grid.

According to yet another embodiment, a machine-readable medium can have stored thereon a series of instructions which, when executed by a processor, cause the processor to implement a logical programming model by defining a plurality of resources and defining one or more state objects for each resource. Each of the plurality of resources and the one or more state objects can be location agnostic and environment agnostic. For example, the one or more state objects can include one or more of a global state object available to a plurality of resources, a conversational state object representing an information flow for the resource, a request state object representing platform specific information for the resource, and/or a session state object representing information specific to a session of the resource. An application can be defined including at least one instance of at least one of the defined resources and at least one instance of the defined one or more state objects for the at least one resource and the logic of the application can handle the one or more state objects independent from the resource.

DETAILED DESCRIPTION

Figure 1:
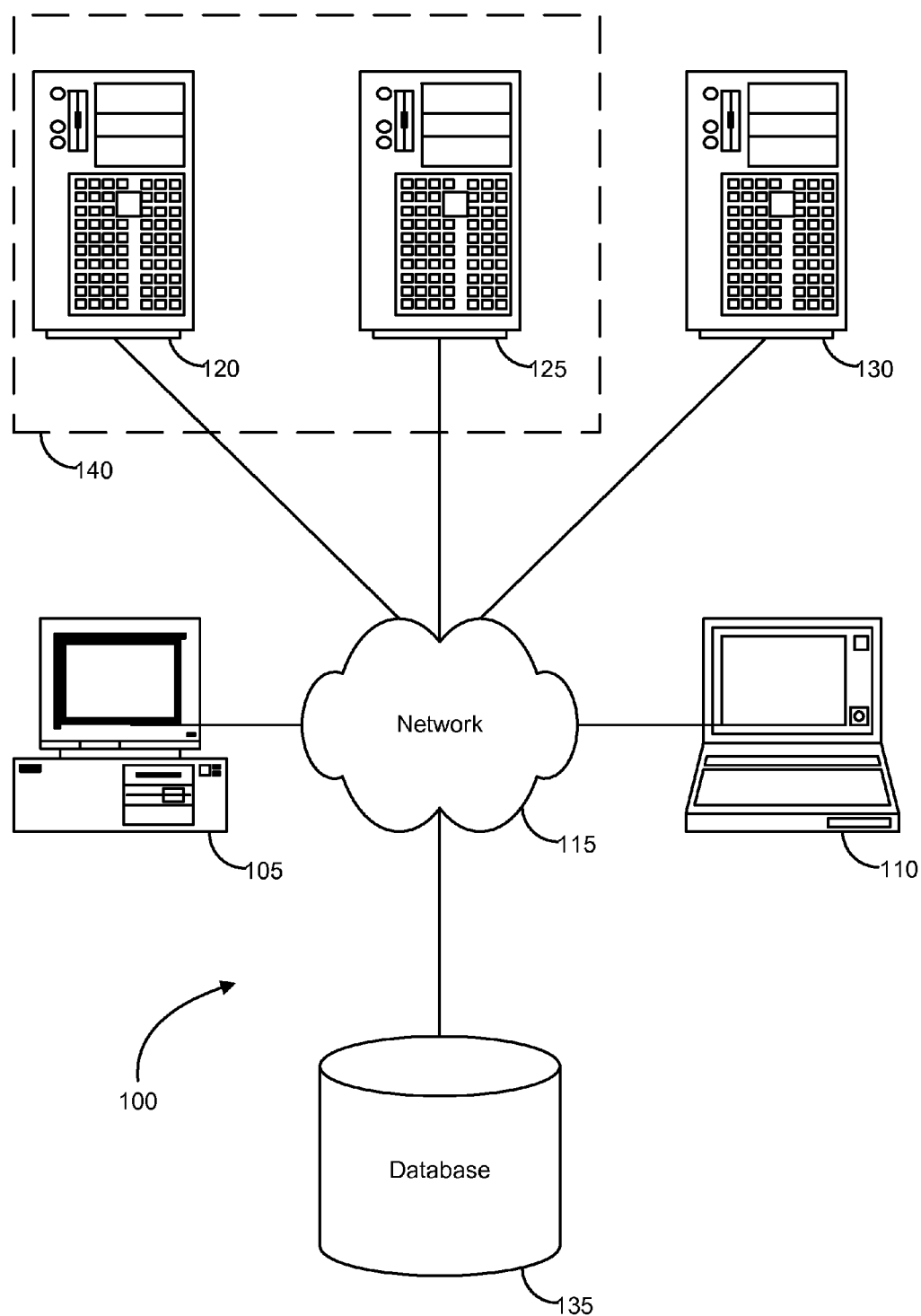
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for implementing a logical programming model. More specifically, embodiments of the present invention provide for implementing a logical programming model by defining a resource and defining one or more state objects for the resource. The resource and the one or more state objects can also be location agnostic and environment agnostic. That is, the resource needs not be aware of the environment in which it is operating and/or where it is located with regard to other resources around it and can act autonomously. In this programming model, the one or more state objects can be handled independent from the resource. For example, the one or more state objects can include a global state object available to a plurality of resources. The one or more state objects can also include a conversational state object representing an information flow for the resource. The one or more state objects may also include a request state object representing platform specific information for the resource. Additionally or alternatively, the one or more state objects can include a session state object representing information specific to a session of the resource.

The programming model described herein is considered to be conducive, for example, to cloud computing. The collective framework of the model consists of a logical API as well as a concrete, reference implementation of the logical API of a grid or system supporting the framework. For example, in one implementation, the underlying grid or system may use Oracle®'s Coherence. The model described herein provides for resource federation, rich state management, a compute grid for batch processing, adaptation to unserializable types, and extensibility.

(1) Resource Federation.

A resource is defined herein as any functionality (for example in the form of a service) that is either (a) idempotent, or (b) can have its state externalized from the resource. The federation model described herein uses only a name and zero additional configurations. It can therefore be used with ease in even the simplest use cases constructed in Java w/POJO's. Resources can be "enlisted" into the federation at any location in the network topology, provided that there is good connectivity between the nodes. The federation is a form of a computer cluster.

Client and server status can be determined on a per-resource basis in the federation. A client program can be a server/provider of Resource A, B, and C and a client/consumer of Resource D, E, and F. Resource deployment states, based on the state objects described herein, can change at any point time. The topology of the deployed resources can change continuously with no interruption of service to the consumer. For example, the resource can comprise an application that provides a "Jukebox" service, and the client plays songs off of the Jukebox while the Jukebox Resources are deployed and undeployed from a variety of nodes in the network with no interruption of service.

As noted above, the programming model described herein can be implemented on a computing grid such as an Oracle® Coherence grid. For example, Coherence provides membership and routing protocols. Typically these protocols are use for data caching. According to one embodiment of the present invention, these protocols can be adapted to provide for remote procedure call routing [RPC], i.e., to the applications, services, or other resources implemented on the grid. The programming model described herein offers a broad range of control surrounding the RPC mechanism. Depending upon how that API is used, one mode of operation offers affinity from a client to a server resource. In another mode, it offers random/round-robin access. The programming model can also be optimized. For instance, when a node is a client of Resource X, and X is co-located on the same node then calls can be short-circuited to be called locally. Implementation of the programming model on a grid such as Coherence enables very high quality of service levels, ensuring that all requests are processed, and processing as a whole across the network is parallelized to support extensive scalability. It should be understood that, while described herein with reference to Coherence, the programming model can be implemented on a variety of other grids or systems without departing from the scope of the present invention.

(2) Rich State Management

According to the programming model described herein, resources can be either idempotent or can have their state externalized from the resource. In the latter case, any state for the resource can be shared across other resources, for example, other resources of the same type. The programming model manages all state instances on the user's behalf. Furthermore, each state object can be implemented to supports Atomicity, Consistency, Isolation, and Durability (ACID) properties.

Additionally or alternatively, the programming model described herein can offer a declarative form of state management and can institutionalize four types of state objects: Global, Session, Conversation, and Request. The state objects can "joined" with processing when and where the processing occurs. Global state can be considered analogous to shared, distributed memory. Session State can be, for example, customer or user-centric (e.g., a shopping cart). Conversational State can be flow-centric, spanning two or more consecutive calls. Request State can be platform-centric used for such things as security, identity, and transaction propagation.

The combination of all four forms of state under one umbrella enables a broad range of application use cases that can be supported with ease. Additionally, since session state alone is the form of State types usage today, the programming model described herein offers the ability to link a customer's pre-existing state object (e.g. an HttpSession) with the other types of session state object.

(3) Compute Grid for Batch Processing

According to one embodiment, "work" can be submitted to the federation for asynchronous batch processing. This can be implemented by extension of an API of the underlying system of the grid on which the model is implemented. For example, the Future API from Sun allows Futures to be [un/]marshaled into the framework by using a context handle replacer. In this way, context objects representing asynchronous/future work results can be materialized into the http session for instance, and reconstructed after a web page is reloaded.

(4) Adaptation to Unserializable Types

Most data managed by applications or databases today are said to be serializable (Strings, Numbers, Dates, etc.). The framework of the programming model described herein offers adaptation to unserializable types (e.g., InputStream, OutputStream, etc.). This can be accomplished using pluggable "Serial Adapters".

(5) Extensibility

Introduction of custom Serialization adapters are one example of the way the framework of the programming model can be extended. In addition, The programming model offers "request interceptors" and "call handlers" as a means for extension. Request interceptors can be used to (a) validate the outgoing request from a client, (b) short-circuit the request from the client, or (c) attach Request State element(s) to the outbound call. Call handlers are a means to receive an inbound request and to control how it is dispatched and processed on the receiving/server end. This technique can be used to adapt the programming model for standalone usage, OSGi usage, or most other platforms or environments. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft® Corp.'s Windows and/or Apple® Corp.'s Macintosh® operating systems) and/or workstation computers running any of a variety of commercially-available UNIX® or UNIX®-like operating systems (including without limitation, the variety of GNU/Linux® operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk®, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM®, GPRS®, EDGE, UMTS, 3G, 2.5 G CDMA, CDMA2000®, WCDMA, EVDO® etc.

The system may also include one or more server computers 120, 125, 130 which can be general purpose computers and/or specialized server computers (including, merely by way of example, PC servers, UNIX® servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle® 10 g, that is adapted to store, update, and retrieve data in response to SQL-formatted commands.

Figure 2:
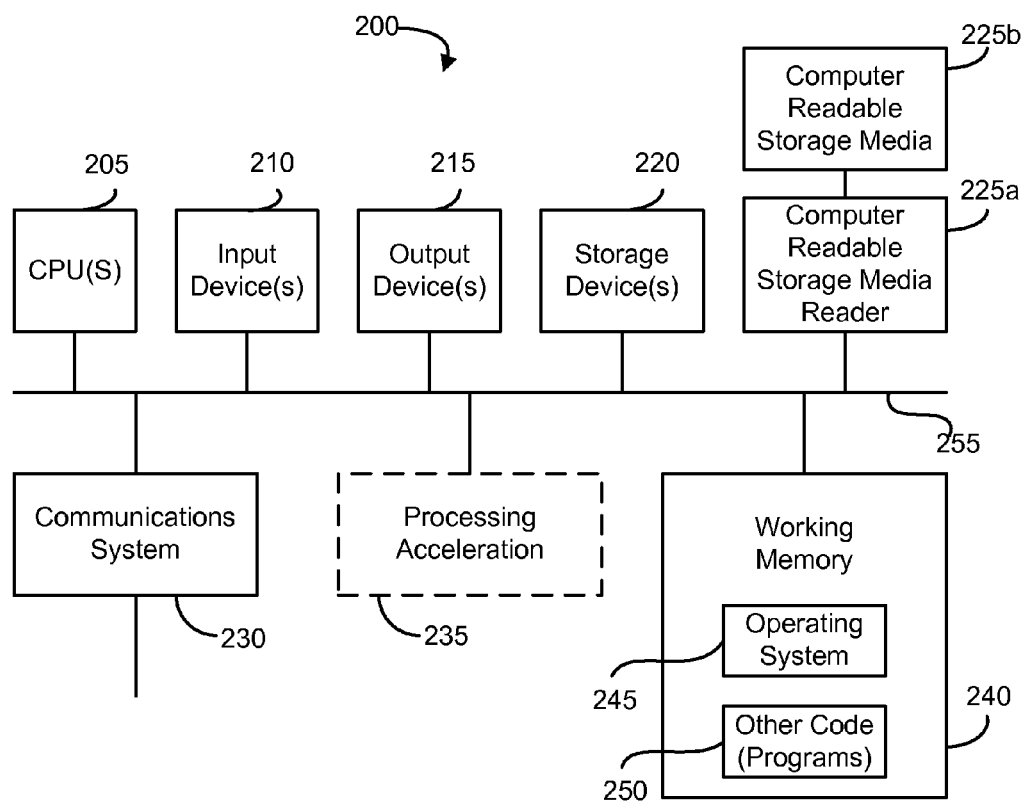
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
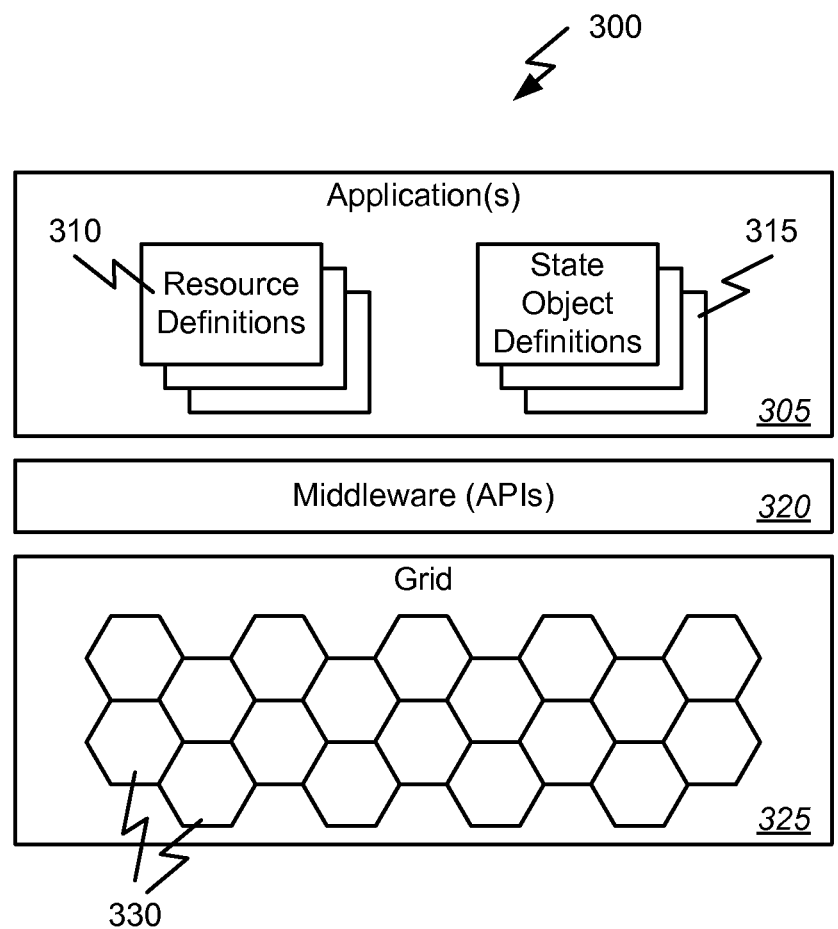
FIG. 3 is a block diagram illustrating a system upon which a logical programming model may be implemented according to one embodiment of the present invention.

FIG. 3 is a block diagram illustrating implementation of a logical programming model according to one embodiment of the present invention. In this example, the model 300 includes one or more applications 305 implemented or defined according to the model. As noted above, implementing a logical programming model according to embodiments described herein can comprise defining a resource 310 or set of resources and defining one or more state objects 315 for each resource. The resources defined by the resource definitions 310 can be implemented on one or more nodes 330 of a computing grid 325. This grid 325 can be implemented with and accessed by a middleware 320 that can include an Application Program Interface (API).

According to this model 300, the one or more state objects 315 can be handled independent from the resources. For example, the one or more state objects 315 can include a global state object available to a plurality of resources. The one or more state objects 315 can also include a conversational state object representing an information flow for the resource. The one or more state objects 315 may also include a request state object representing platform specific information for the resource. Additionally or alternatively, the one or more state objects 315 can include a session state object representing information specific to a session of the resource. According to one embodiment of the present programming model 300, the resource and the one or more state objects can also be location agnostic and environment agnostic. That is, the resource needs not be aware of the environment in which it is operating and/or where it is located with regard to other resources around it and can act autonomously.

According to one embodiment, the resource definitions 310 can comprises definitions of a process. For example, the process can comprise a service or a plurality of services. Accordingly, the one or more state object definitions 315 can define state objects for each of the plurality of services. In some cases, a federation of services can be defined within the plurality of services wherein the services of the federation share at least one of these state objects.

As noted above, the plurality of services can be executed on the computing grid 325. For example, in one implementation, the grid 325 can comprise an Oracle® Coherence grid. In such a case, the APIs of the middleware 320 can include interfaces to the routing and membership protocols for the grid 325. Therefore, according to one embodiment, access to the plurality of services and the one or more state objects as they are implemented and executed on the grid 325 can be performed via the APIs to the membership and routing protocols of the grid 325.

Figure 4:
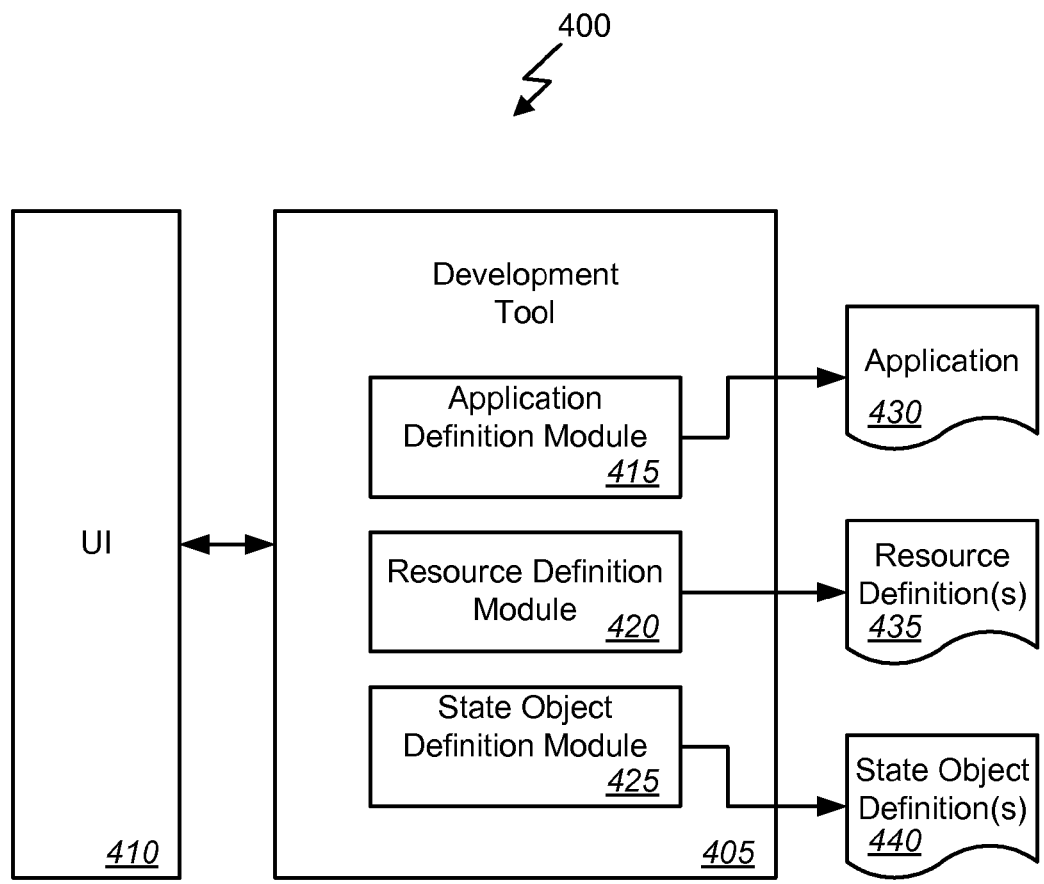
FIG. 4 is a block diagram illustrating implementation of a logical programming model according to one embodiment of the present invention.

FIG. 4 is a block diagram illustrating implementation of a logical programming model according to one embodiment of the present invention. As described above with reference to the computer system 200 of FIG. 2, a system, i.e., a development system, can comprise a processor 205 and a memory 240 communicatively coupled with and readable by the processor 205. The memory 240 can have stored therein a series of instructions which, when executed by the processor 205, cause the processor to execute a development environment 400 for implementing a logical programming model. The development environment 400 can include a development tool 405 and a user interface 410. The development tool 405 can comprise an application through which a programmer or developer can generate applications according to the logical programming model described herein. The user interface 410 can comprise any textual, graphical, or other interface through which the programmer or developer can access and interact with the development tool 405.

The development tool 405, based on instructions another input from the developer through the user interface 410, can be adapted to define a resource. That is, a resource definition module 420 of the development tool 405 can generate one or more resource definitions 435. The development tool 405 can also be adapted to define state objects for each resource. That is, a state object definition module 425 of the development tool 405 can generate one or more state object definitions 435 for each resource based on instructions another input from the developer through the user interface 410.

The development tool 405 can also, and again based on instructions another input from the developer through the user interface 410, be adapted to define an application. That is, an application definition module 415 for generating a high level language program and perhaps including a compiler, can generate an application 430. The application 430 can include at least one instance of the defined resource and at least one instance of the defined one or more state objects. The logic of the application can handle the one or more state objects independent from the resource.

As noted above, the resource or multiple resources defined by resource definitions 435 can referenced in application 430 can comprise one or more processes. For example the processes can comprise a service or a plurality of services utilized by the application 430. Furthermore, in some cases, a federation of services can be defined within the plurality of services can be defined, for example within the resource definitions 435. The services of the federation can share at least one state object of the state object definitions 440. Whether federated or not, the plurality of services can be executed on a computing grid such as, for example, an Oracle® Coherence grid and accessed via membership and routing protocols of the grid as noted above.

Figure 5:
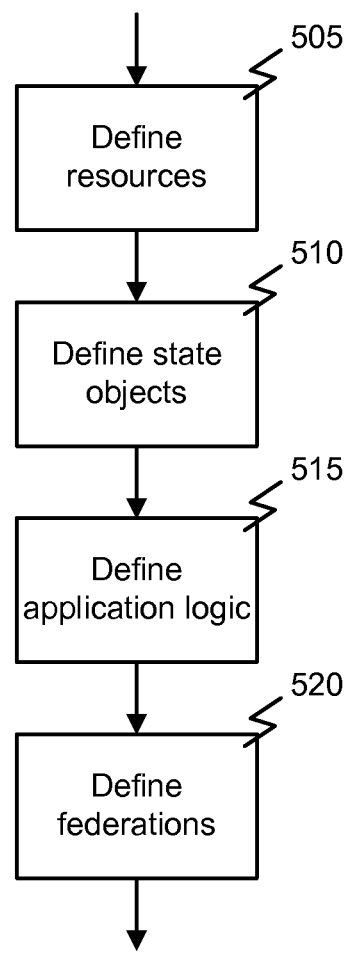
FIG. 5 is a flowchart illustrating a process for implementation of a logical programming model according to one embodiment of the present invention.

FIG. 5 is a flowchart illustrating a process for implementation of a logical programming model according to one embodiment of the present invention. In this example, implementing a logical programming model can comprise defining 505 a resource and defining 510 one or more state objects for the resource. For example, the one or more state objects can include a global state object available to a plurality of resources. Additionally or alternatively, the one or more state objects may include a conversational state object representing an information flow for the resource. The one or more state objects can include a request state object representing platform specific information for the resource. In some cases, one or more state objects can additionally or alternatively include a session state object representing information specific to a session of the resource. The resource and the one or more state objects can be location agnostic and environment agnostic.

An application process or logic can be defined 515 including at least one instance of the defined resource and at least one instance of the defined one or more state objects. Logic of the application can handle the one or more state objects independent from the resource. In some cases, the resource or multiple resources can comprise one or more processes. For example the process can comprise a service or a plurality of services. In such a case, one or more state objects can be defined for each of the plurality of services. Furthermore, in some cases, a federation of services within the plurality of services can be defined 520 wherein the services of the federation share at least one state object.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for implementing a logical programming model, the method comprising:

defining, by a development system, a plurality of resource definitions, wherein each resource definition of the plurality of resource definitions comprises a definition of a different resource of a plurality of resources on one or more nodes of a computing grid;

defining, by the development system, a plurality of state objects for each resource of the plurality of resources, wherein the plurality of state objects are defined separately from the plurality of resource definitions and the plurality of resources, and wherein the plurality of state objects comprise at least one global state object, at least one conversational state object, at least one request state object, and at least one session state object; and defining, by the development system, an application including at least one instance of one of the plurality of resources and at least one instance of the defined plurality of state objects, wherein logic of the application handles the at least one instance of the defined plurality of state objects independent and separate from the at least one instance of one of the plurality of resources when executed on the computing grid.

2. The method of claim 1, wherein the at least one global state object is available to all resources of the plurality of resources.

3. The method of claim 2, wherein the at least one conversational state object represents an information flow, is flow-centric, and spans two or more consecutive calls.

4. The method of claim 3, wherein the at least one request state object represents platform specific information for a node of the computing grid including one or more of security information, identity information, or transaction propagation information.

5. The method of claim 4, wherein the at least one session state object represents information specific to a session and is user-centric.

6. The method of claim 5, wherein the plurality of resources and the plurality of state objects are location agnostic.

7. The method of claim 6, wherein the plurality of resources and the plurality of state objects are environment agnostic.

8. The method of claim 1, wherein the plurality of resources comprises at least one process executing on the computing grid.

9. The method of claim 8, wherein the at least one process comprises a service.

10. The method of claim 9, further comprising defining a plurality of services and defining a plurality of state objects for each service of the plurality of services.

11. The method of claim 10, further comprising defining a federation of services within the plurality of services, wherein the plurality of services of the federation of services share at least one global state object.

12. The method of claim 10, further comprising executing the plurality of services on the computing grid.

13. The method of claim 12, wherein the computing grid comprises an Oracle Coherence grid.

14. The method of claim 13, further comprising providing access to the plurality of services and the plurality of state objects via membership and routing protocols of the computing grid.

15. A system comprising:
a processor; and
a memory communicatively coupled with and readable by the processor and having stored therein a series of instructions which, when executed by the processor, cause the processor to execute a development environment for implementing a logical programming model, wherein the development environment is adapted to define a plurality of resource definitions, wherein each resource definition of the plurality of resource definitions comprises a definition of a different resource of a plurality of resources on one or more nodes of a computing grid, define a plurality of state objects for each resource of the plurality of resources, wherein the plurality of state objects are defined separately from the plurality of resource definitions and the plurality of resources, and wherein the plurality of state objects comprise at least one global state object, at least one conversational state object, at least one request state object, and at least one session state object, and define an application including at least one instance of one of the plurality of resources and at least one instance of the defined plurality of state objects, wherein logic of the application handles the at least one instance of the defined plurality of state objects independent and separate from the at least one instance of one of the plurality of resources when executed on the computing grid.

16. The system of claim 15, wherein the at least one global state object is available to all resources of the plurality of resources across nodes of the computing grid, the at least one conversational state object represents an information flow, is flow-centric, and spans two or more consecutive calls, the at least one request state object represents platform specific information for a node of the computing grid including one or more of security information, identity information, or transaction propagation information, and the at least one session state object represents information specific to a session and is user-centric.

17. The system of claim 16, wherein the plurality of resources and the plurality of state objects are location agnostic and environment agnostic.

18. The system of claim 17, wherein the plurality of resources comprises a plurality of processes executing on the computing grid, wherein each process of the plurality of processes comprises a service, and wherein defining the application comprises defining a plurality of services, defining a plurality of state objects for each service of the plurality of services, and defining a federation of services within the plurality of services, wherein the plurality of services of the federation of services share at least one global state object.

19. The system of claim 18, wherein the computing grid is adapted to execute the plurality of services, and wherein the computing grid comprises an Oracle Coherence grid.

* * * * *

UNITED STATES PATENT AND TRADEMARK OFFICE
CERTIFICATE OF CORRECTION

| | |
|---|---|
| PATENT NO. | : 8,898,621 B2 |
| APPLICATION NO. | : 12/845002 |
| DATED | : November 25, 2014 |
| INVENTOR(S) | : Trent |

Page 1 of 1

It is certified that error appears in the above-identified patent and that said Letters Patent is hereby corrected as shown below:

In the Specification

In column 5, line 11, delete "use" and insert -- used --, therefor.

In column 6, line 13, delete "The" and insert -- the --, therefor.

In column 6, line 51, delete "may can" and insert -- can --, therefor.

Signed and Sealed this
Eleventh Day of August, 2015

Michelle K. Lee
*Director of the United States Patent and Trademark Office*